US012801796B2

(12) United States Patent
Zhang et al.

(10) Patent No.: US 12,801,796 B2
(45) Date of Patent: Nov. 17, 2026

(54) METHOD, APPARATUS AND ELECTRONIC DEVICE FOR CONTROLLING ACCESS OF USB DEVICE

(71) Applicant: BEIJING BEYONDINFO TECHNOLOGY CO., LTD., Beijing (CN)

(72) Inventors: Hao Zhang, Beijing (CN); Hua Du, Beijing (CN); Zhenhe Cai, Beijing (CN)

( * ) Notice: Subject to any disclaimer, the term of this patent is extended or adjusted under 35 U.S.C. 154(b) by 105 days.

(21) Appl. No.: 18/678,110

(22) Filed: May 30, 2024

(65) Prior Publication Data

US 2024/0320380 A1 Sep. 26, 2024

Related U.S. Application Data

(63) Continuation of application No. PCT/CN2022/130163, filed on Nov. 6, 2022.

(30) Foreign Application Priority Data

Nov. 30, 2021 (CN) ......................... 202111449978.2

(51) Int. Cl.
*G06F 21/85* (2013.01)

(52) U.S. Cl.
CPC .................................... *G06F 21/85* (2013.01)

(58) Field of Classification Search
None
See application file for complete search history.

(56) References Cited

U.S. PATENT DOCUMENTS

| | | | | |
|---|---|---|---|---|
| 7,877,788 | B1 * | 1/2011 | Topp | G06F 21/44 726/17 |
| 8,281,058 | B1 * | 10/2012 | McCorkendale | G06F 13/102 710/313 |
| 11,544,416 | B2 * | 1/2023 | Appleboum | G06F 21/577 |
| 2002/0143921 | A1 * | 10/2002 | Stephan | G06F 13/4081 709/224 |
| 2006/0143454 | A1 * | 6/2006 | Walmsley | G06F 21/85 713/170 |
| 2009/0265722 | A1 * | 10/2009 | Lu | G06F 13/387 719/327 |

(Continued)

FOREIGN PATENT DOCUMENTS

KR 20070017609 A * 2/2007 ............ G06F 21/85

*Primary Examiner* — Michael Pyzocha

(57) ABSTRACT

The disclosure relates to a method for controlling access of a USB device, the method is applied to a USB access control device which is connected with a protected device through interfaces. In this way, the data of the protected device can be protected through the USB access control device which is externally connected to the protected equipment. The data security of the protected device can be ensured without installing security protection software. The USB access control device can determine whether to turn on the switch in the USB access control device according to the descriptor/descriptors of the USB device. If each one of the descriptors of the USB device is the same as that in the registration information of the USB device, the switch in the USB access control device is turn on, so that the USB device can communicate with the protected device.

20 Claims, 13 Drawing Sheets

(56) References Cited

U.S. PATENT DOCUMENTS

| | | | | |
|---|---|---|---|---|
| 2012/0311207 | A1* | 12/2012 | Powers | G06F 13/385 710/106 |
| 2013/0014221 | A1* | 1/2013 | Moore | G06F 21/572 726/3 |
| 2014/0337558 | A1* | 11/2014 | Powers | G06F 13/42 710/313 |
| 2016/0179556 | A1* | 6/2016 | McGowan | G06F 21/73 710/104 |
| 2018/0097629 | A1* | 4/2018 | Soffer | H04L 9/3234 |
| 2018/0268144 | A1* | 9/2018 | Warpinski | G06F 21/85 |
| 2018/0270194 | A1* | 9/2018 | Beitler | G06F 21/554 |
| 2020/0218809 | A1* | 7/2020 | Lam | G06F 21/554 |
| 2021/0133319 | A1* | 5/2021 | Rodriguez Bravo | G06F 21/83 |
| 2022/0019549 | A1* | 1/2022 | Liebinger Portela | G06F 11/3051 |

* cited by examiner

METHOD, APPARATUS AND ELECTRONIC DEVICE FOR CONTROLLING ACCESS OF USB DEVICE

CROSS-REFERENCE TO RELATED APPLICATION

This application claims the benefit of Chinese Patent Application No. 202111449978.2, filed on Nov. 30, 2021 in the China National Intellectual Property Administration, the disclosure of which is incorporated herein by reference.

BACKGROUND OF THE INVENTION

1. Technical Field

The disclosure relates to device access controlling method, in particular to a method, an apparatus, and an electronic device and computer-readable medium for controlling access of a USB device.

2. Technical Background

In recent years, the rapid development of computer and network technology has greatly promoted the popularity of the network. While people are enjoying the convenience brought by the network, it also poses new threats to the data security of computers used by people in production or life, such as common malicious code intrusion, virus/Trojan infection, traffic attack, hacker stealing, unauthorized access, impersonating legitimate users, destroying data integrity, interfering with the normal operation of the system, spreading viruses through the network and eavesdropping by intermediaries.

At present, there are many technical means to solve the data security problem of intranet computer network, such as installing and using black/white list, flow control software, firewall, anti-virus, intrusion detection system and other network security products in the host, but after taking the above measures, various network security incidents still occur frequently. According to statistics, 70% of computer crimes are caused by the illegal use of mainframe and other key resources by internal personnel, and only 30% are really threatened from the outside. Internal personnel lack safety awareness when using mainframe, and are located at the back end of firewall, and access to various external devices is not standardized, which leads to data leakage, virus infection, system collapse and even network paralysis. At the same time, misoperation or deliberate destruction of the system will also cause bad to institutions, enterprises and institutions.

At the same time, for some special equipment, such as the mainframe equipped with special software control, and the equipment of engineer's station/worker's station in some industrial fields, due to the particularity of the system, there is no security protection software suitable for this kind of system in the market, or the installation of security software may easily lead to compatibility problems or even affect the performance of the original software of the mainframe. In addition, the hosts of these engineer stations or staff stations basically do not upgrade the operating system after going online, and even after installing security software, they often do not update the anti-malicious code software version and malicious code base in time, which does not play a comprehensive security protection role.

The above information disclosed in the background section is only for enhancing understanding of the background of the present disclosure, so it may include information that does not form the prior art that is known to a person of ordinary skill in the art.

SUMMARY OF THE INVENTION

In view of this, the present disclosure provides a USB device access control method, device, electronic device and computer-readable medium, which can protect the data security of the protected device through the USB access control device externally connected to the protected device.

Other features and advantages of the disclosure will become apparent from the detailed description that follows, or may be learned in part by practice of the disclosure.

According to an aspect of the present disclosure, a USB device access control method is proposed, which is applied to a USB access control device, and the USB access control device is connected with a protected device through an interface, and the method comprises the following steps: acquiring a descriptor of the USB device when the USB device is inserted into the USB access control device; Comparing the descriptor of the USB device with the registration information of the USB device; If the descriptor of the USB device is the same as that in the registration information of the USB device, the switch in the USB access control device is closed, so that the USB device can communicate with the protected device; When the USB device communicates with the protected device, the descriptor of the USB device is continuously acquired, and the descriptor of the USB device is compared with the registration information of the USB device; If the descriptor of the USB device is different from the registration information of the USB device, turn off the switch in the USB access control device.

Optionally, the step of acquiring the descriptor of the USB device comprises sending a Get_Descriptor control packet to the USB device; receiving a device descriptor determined by the USB device according to the Get_Descriptor control packet.

Optionally, the step of comparing the descriptor of the USB device with the registration information of the USB device comprises: comparing to determine whether the bDeviceClass in the device descriptor is the same as the bDeviceClass in the registration information; Comparing to determine whether the bDeviceSubClass in the device descriptor is the same as the bDeviceSubClass in the registration information; Comparing to determine whether bDeviceProtocol in the device descriptor is the same as bDeviceProtocol in the registration information; Comparing to determine whether the bLength in the device descriptor is the same as the bLength in the registration information; Comparing to determine whether the bdescriptype in the device descriptor is the same as the bdescriptype in the registration information; And comparing to determine whether the bString in the device descriptor is the same as the bString in the registration information.

Alternatively, if the descriptor of the USB device is the same as that in the registration information of the USB device, Closing the switch in the USB access control device comprises: if bDeviceClass, bDeviceSubClass, bDeviceProtocol, bLength, bDescriptorType, and bString in the device descriptor and bDeviceClass, bDeviceSubClass, BDeviceProtocol, bLength, bDescriptorType and bString have the same correspondence, and the switch in the USB access control device is closed.

Alternatively, if the descriptor of the USB device is different from the registration information of the USB device, turning off the switch in the USB access control device comprises: if bDeviceClass, bDeviceSubClass, bDeviceProtocol, bLength, bDescriptorType, and bString in the device descriptor and bDeviceClass, bDeviceSubClass, If there is any difference among bDeviceProtocol, bLength, bDescriptorType and bString, turning off the switch in the USB access control device.

Optionally, the step of acquiring the descriptor of the USB device s sending a Get_Descriptor_Configuration control packet to the USB device; receiving a configuration descriptor determined by the USB device according to the Get_Descriptor_Configuration control packet.

Optionally, comparing to determine the descriptor of the USB device with the registration information of the USB device comprises: comparing whether the bNumInterfaces in the configuration descriptor are the same as those in the registration information; Comparing to determine whether the bConfigurationValue in the configuration descriptor is the same as the bConfigurationValue in the registration information; And comparing to determine whether the wTotalLength in the configuration descriptor is the same as the wTotalLength in the registration information.

Optionally, if the descriptor of the USB device is the same as that in the registration information of the USB device, closing the switch in the USB access control device includes closing the switch in the USB access control device if the bNumInterfaces, bConfigurationValue and wTotalLength in the configuration descriptor correspond to the bNumInterfaces, bConfigurationValue and wtotallength in the registration information.

Alternatively, if the descriptor of the USB device is/are different from the registration information of the USB device, the step of turning off the switch in the USB access control device includes turning off the switch in the USB access control device if there is any difference between bNumInterfaces, bConfigurationValue and wTotalLength in the configuration descriptor and bNumInterfaces, bConfigurationValue and wTotalLength in the registration information.

Optionally, the step of acquiring the descriptor of the USB device includes sending a Get_Descriptor_Configuration control packet to the USB device; receiving an interface descriptor determined by the USB device according to the Get_Descriptor_Configuration control packet.

Optionally, comparing to determine the descriptor of the USB device with the registration information of the USB device comprises comparing to determine whether the bInterfaceNumber in the interface descriptor is the same as the bInterfaceNumber in the registration information; Comparing to determine whether the bInterfaceClass in the interface descriptor is the same as the bInterfaceClass in the registration information; Comparing to determine whether the bInterfaceSubClass in the interface descriptor is the same as the bInterfaceSubClass in the registration information; And comparing to determine whether the bInterfaceProtocol in the interface descriptor is the same as the bInterfaceProtocol in the registration information.

Optionally, if the descriptor/descriptors of the USB device is/are the same as that/those in the registration information of the USB device, the step of turning on the switch in the USB access control device comprises: if the interface descriptors bInterfaceNumber, bInterfaceClass, bInterfaceSubClass, bInterfaceProtocol are correspondingly the same as the bInterfaceNumber, bInterfaceClass, BInterfaceSubClass bInterfaceProtocol in the registration information, turning on the switch in the USB access control device.

Optionally, if the descriptor/descriptors of the USB device is/are different from that/those in the registration information of the USB device, turning off the switch in the USB access control device comprises: if there is any difference between the interface descriptors bInterfaceNumber, bInterfaceClass, bInterfaceSubClass, bInterfaceProtocol and the bInterfaceNumber, bInterfaceClass, bInterfaceSubClass bInterfaceProtocol in the registration information, turning off the switch in the USB access control device.

Optionally, the descriptor of the USB device includes a device descriptor, a configuration descriptor, and an interface descriptor; If the descriptors of the USB device are the same as those in the registration information of the USB device, turning on the switch in the USB access control device comprises turning on the switch in the USB access control device if the device descriptor, configuration descriptor and interface descriptor of the descriptor of the USB device are the same as those in the registration information.

Optionally, if the descriptor/descriptors of the USB device is/are different from that/those in the registration information of the USB device, turning off the switch in the USB access control device comprises turning off the switch in the USB access control device if the device descriptor, configuration descriptor and interface descriptor of the descriptors of the USB device are different from those in the registration information.

Optionally, if the USB device is an HID device, the descriptors of the USB device further includes an HID descriptor; If the descriptor/descriptors of the USB device is/are the same as that/those in the registration information of the USB device, turning on the switch/switches in the USB access control device comprises turning on the switch/switches in the USB access control device if the device descriptor, configuration descriptor, interface descriptor and HID descriptor of the descriptors of the USB device correspond to the device descriptor, configuration descriptor, interface descriptor and HID descriptor in the registration information.

Optionally, if the descriptor/descriptors of the USB device is/are different from the registration information of the USB device, turning off the switch in the USB access control device comprises turning off the switch/switches in the USB access control device if the device descriptor, configuration descriptor, interface descriptor and HID descriptor of the descriptors of the USB device are different from those in the registration information.

According to an aspect of the present disclosure, an apparatus for controlling access of a USB device access is proposed, and the USB access control apparatus is connected with a protected device through an interface, and the apparatus comprises a first acquiring module, a second acquiring module and a second acquiring module, wherein the first acquiring module acquires a descriptor of the USB device when the USB device is inserted into the apparatus for controlling access of a USB device; The comparison module is used for comparing the descriptor of the USB device with the registration information of the USB device; A closing module, if the descriptor of the USB device is the same as that in the registration information of the USB device, turning on a switch in the apparatus to enable the USB device to communicate with the protected device; A second acquisition module, which continuously acquires the descriptor of the USB device when the USB device communicates with the protected device, and compares the descriptor of the USB device with the registration information of the USB device; The turning-off module is used for turning off the switch/switches in the USB access control apparatus if the descriptor of the USB device is different from the registration information of the USB device.

According to an aspect of the present disclosure, an electronic device is provided, which includes one or more processors; Storage means for storing one or more programs; when one or more programs are executed by one or more processors, the one or more processors are caused to implement the method as described above.

According to an aspect of the present disclosure, a computer-readable medium is proposed, on which a computer program is stored, which, when executed by a processor, implements the method as described above.

According to the USB device access control method, device, electronic device and computer-readable medium disclosed by the disclosure, the method is applied to the USB access control device, and the USB access control device is connected with the protected device through an interface. In this way, the data security of the protected equipment can be protected through the USB access control equipment connected externally to the protected equipment. The data security of the protected equipment can be ensured without installing security protection software on the protected equipment. The USB access control device can determine whether to close the switch in the USB access control device according to the descriptor of the USB device. If the descriptor of the USB device is the same as that in the registration information of the USB device, the switch in the USB access control device is closed, so that the USB device can communicate with the protected device. At this time, although the descriptor of the USB device has passed the verification, in order to strengthen the protection of the protected device, it is necessary to continue to acquire the descriptor of the USB device and compare the descriptor of the USB device with the registration information of the USB device in real time. This further ensures the data security of the protected equipment.

It should be understood that both the foregoing general description and the following detailed description are exemplary only and are not restrictive of the present disclosure.

BRIEF DESCRIPTION OF DRAWINGS

The above and other objects, features and advantages of the present disclosure will become more apparent by describing example embodiments thereof in detail with reference to the accompanying drawings. The drawings described below are only some embodiments of the present disclosure, and other drawings can be obtained according to these drawings without creative work for ordinary technicians in the field.

DETAILED DESCRIPTION

Figure 1:
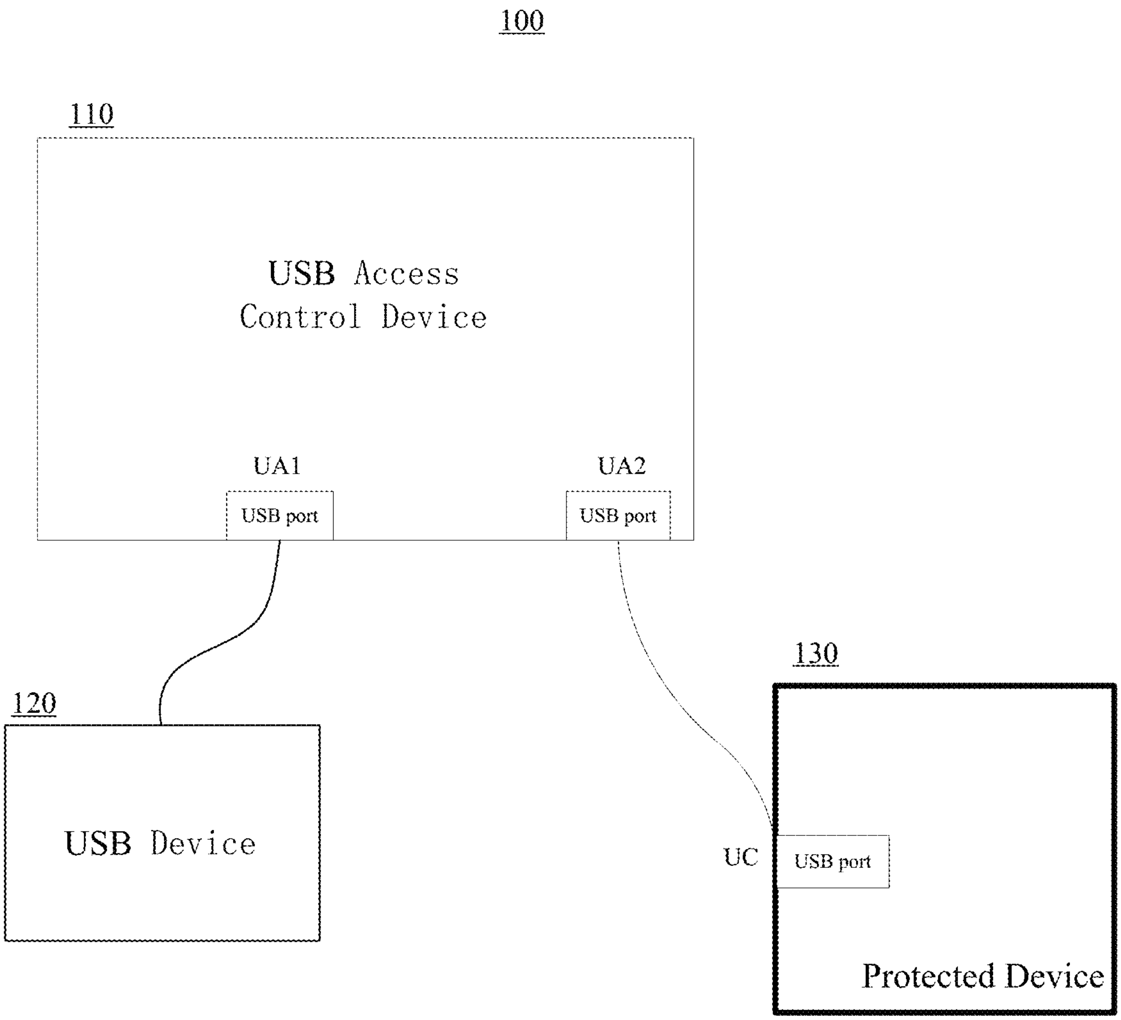
FIG. 1 is a schematic diagram of the structure of a USB device access control system shown according to an exemplary embodiment.

The example embodiments will now be described more fully with reference to the accompanying drawings. However, example embodiments can be implemented in a variety of forms and should not be construed as confined to the embodiments set forth herein; On the contrary, the provision of these embodiments is such that the present disclosure will be comprehensive and complete, and the idea of the example embodiments will be fully taught to those skilled in the art. The same reference marks in the diagram indicate the same or similar parts, so that repeated descriptions of them will be omitted.

Furthermore, the described features, structures, or characteristics may be combined in any suitable manner in one or more embodiments. In the following description, numerous specific details are provided to give a thorough understanding of the embodiments of the present disclosure. However, those skilled in the art will realize that the technical solution of the present disclosure can be practiced without one or more of the specific details, or other methods, components, devices, steps, etc. can be adopted. In other embodiments, well-known methods, devices, implementations or operations are not shown or described in detail to avoid obscuring aspects of the present disclosure.

The block diagrams shown in the drawings are only functional entities, and do not necessarily correspond to physically independent entities. That is, these functional entities may be implemented in the form of software, or in one or more hardware modules or integrated circuits, or in different networks and/or processor devices and/or microcontroller devices.

The flow charts shown in the attached drawings are only illustrative, and do not necessarily include all contents and operations/steps, nor do they have to be executed in the described order. For example, some operations/steps can be decomposed, while others can be merged or partially merged, so the actual execution order may change according to the actual situation.

It should be understood that although the terms first, second, third, etc. may be used herein to describe various components, these components should not be limited by these terms. These terms are used to distinguish one component from another. Therefore, the first component discussed below may be referred to as the second component without departing from the teachings of the concepts of the present disclosure. As used herein, the term "and/or" includes any one and all combinations of one or more of the associated listed items.

It can be understood by those skilled in the art that the drawings are only schematic diagrams of example embodiments, and the modules or processes in the drawings are not necessary for the implementation of the present disclosure, so they cannot be used to limit the protection scope of the present disclosure.

FIG. 1 is a schematic diagram of the structure of a USB device access control system shown according to an exemplary embodiment.

As shown in FIG. 1, the USB device access control system 100 may include a USB access control device 110, a USB device 120 and a protected device 130. The USB access control device 110 has two USB ports, namely USB port UA1 and USB port UA2. The number of USB ports can be increased according to actual application scenarios.

In this embodiment, the USB access control device 110 and the USB device 120 can be connected through the USB port UA1. The USB access control device 110 and the protected device 130 can be connected through the USB port UA2. Among them, the USB access control device 110 can be used to protect the security of data in the protected device 130. For example, when the USB device 120 is plugged into the USB port UA1 of the USB access control device 110, the USB access control device 110 can determine whether to allow the USB device 120 to communicate with the protected device 130 according to the descriptor/descriptors of the USB device 120. Specifically, if the descriptor/descriptors of the USB device 120 is/are the same as that in the registration information of the USB device 120, the USB device 120 will be allowed to communicate with the protected device 130. Conversely, if the descriptor/descriptors of the USB device 120 is/are different from the registration information of the USB device 120, the USB device 120 will not be allowed to communicate with the protected device 130.

In this embodiment, the USB access control device 110 may be a security device with data protection features. The USB device 120 may be an external storage device, an external HID device, or the like. For example, the external storage device can be a flash driver a portable hard disk, and so on. The external HID device can be a mouse, a keyboard, a gamepad, etc.

Figure 2:
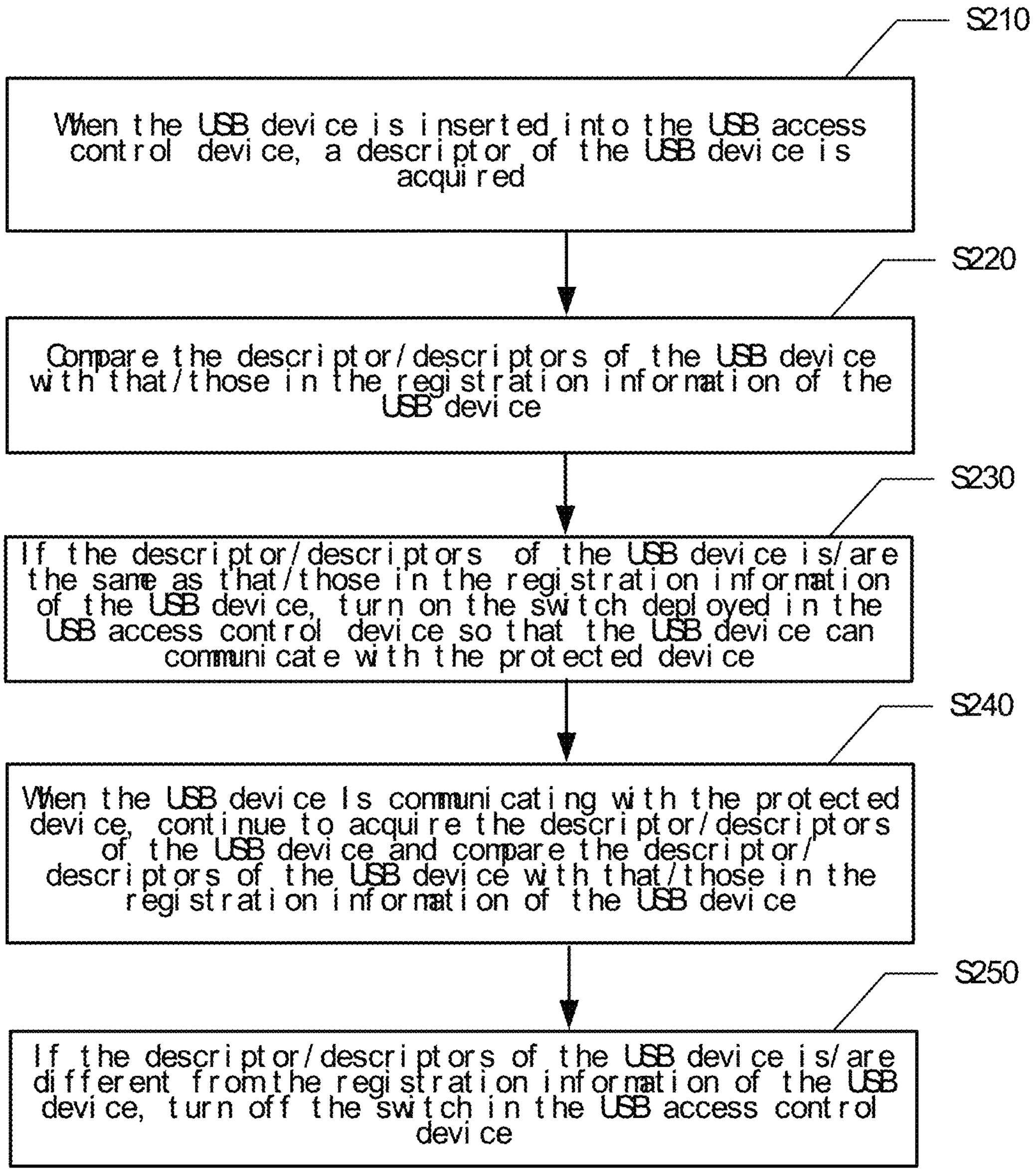
FIG. 2 is a flowchart of a method for controlling access of USB device according to an exemplary embodiment.

FIG. 2 is a flowchart of a USB device access control method according to an exemplary embodiment. The method is applied to the USB access control device, which is connected with the protected device through an interface.

As shown in FIG. 2, the USB device access control method may comprise steps S210~ to S250.

In step S210, when the USB device is connected with the USB access control device, the descriptor/descriptors of the USB device is/are acquired.

In step S220, the descriptor/descriptors of the USB device is/are compared with that in the registration information of the USB device.

In step S230, if the descriptor/descriptors of the USB device is/are the same as that in the registration information of the USB device, the switch in the USB access control device is turned on, so that the USB device can communicate with the protected device.

In step S240, when the USB device communicates with the protected device, the descriptor/descriptors of the USB device is/are continuously acquired, and the descriptor/descriptors of the USB device is/are compared with that in the registration information of the USB device.

In step S250, if the descriptor/descriptors of the USB device is/are different from that in the registration information of the USB device, the switch in the USB access control device is turned off.

This method can protect the data security of the protected device by connecting the USB access control device to the protected device. The data security of the protected device can be ensured without installing security protection software on the protected device by this way. For example, the USB access control device can determine whether to turn on the switch in the USB access control device according to the descriptor/descriptors of the USB device. If the descriptor/descriptors of the USB device is/are the same as that in the registration information of the USB device, the switch in the USB access control device will be turned on, so that the USB device can communicate with the protected device. At this time, although the descriptor of the USB device has been verified, in order to strengthen the protection of the protected device, it is necessary to continue to acquire the descriptor/descriptors of the USB device and compare the descriptor/descriptors of the USB device with that in the registration information of the USB device in real time. This further ensures the data security of the protected equipment.

Figure 3:
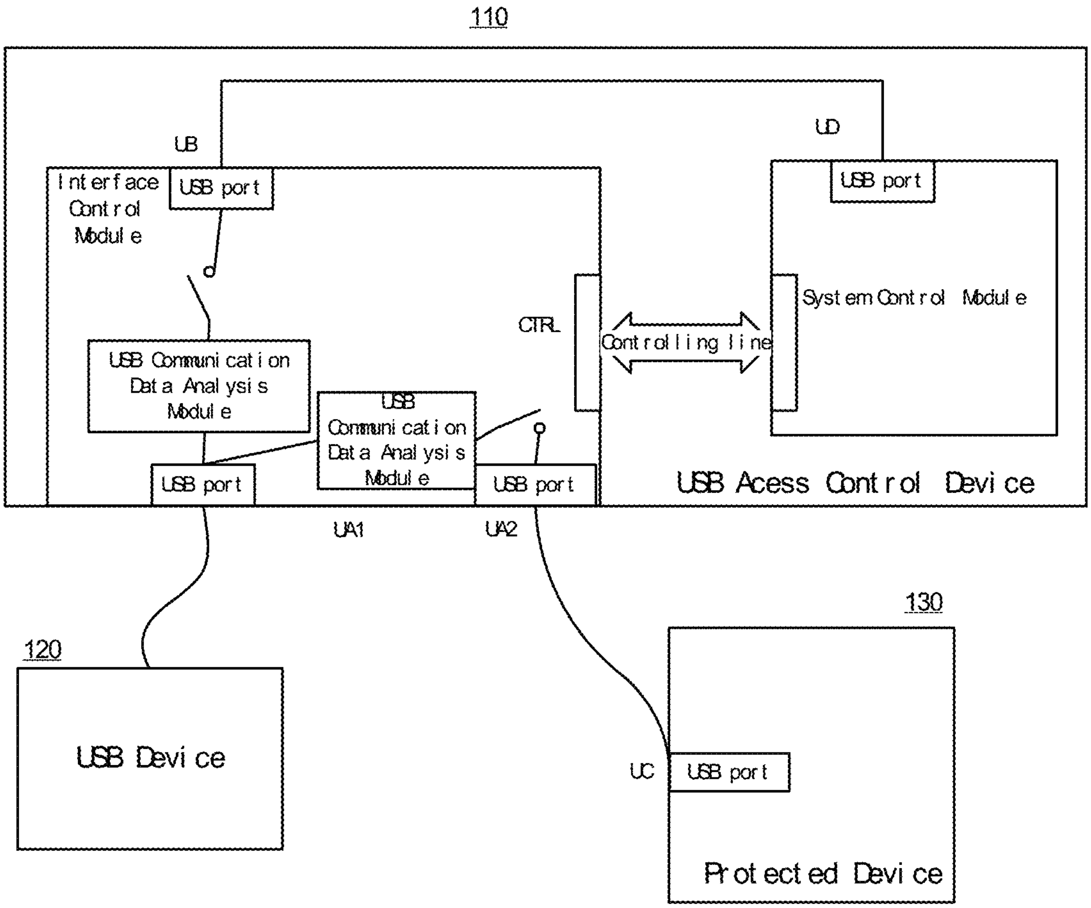
FIG. 3 is a schematic diagram of the specific deployment of the USB communication data analyzing module in the USB access control device according to an exemplary embodiment.

Referring to FIG. 3, the USB access control device 110 may include an interface control module and a system control module. Among them, the interface control module has three USB ports, namely USB port UA1, USB port UA2 and USB port UB. USB port UA1 and USB port UA2 are external interfaces, and USB port UB is an internal interface. The internal interface UA2 is connected to the corresponding USB port UC of the protected device 130. The external interface UA1 is used to access one or more USB device/devices 120. The system control module is connected with an internal interface, which is a USB port UD. The UD of the system control module is used to electrically connect with the UB of the interface control module, and the interface control module controls the security authentication of the external device accessed by the external interface UA1.

In this embodiment, two USB communication data analyzing modules and two switches are also deployed in the interface control module. As shown in FIG. 3, one end of a USB communication data analyzing module is connected to the external interface UA1, the other end is connected to one end of a switch, and the other end of the switch is connected to the internal interface UB. One end of another USB communication data analyzing module is connected with the external interface UA1, the other end is connected with one end of the other switch, and the other end of the other switch is connected with the external interface UA2. In this way, the USB communication data analyzing module is connected in series and bypassed on the connection line between the external interface of the interface control module and the USB port of the protected device, and the descriptor/descriptors of the USB device in the direct connection path will be monitored in real time. The USB communication data analyzing module is implemented based on USB protocol analysis and is used to analyze the descriptor/descriptors of the USB device.

In this embodiment, when USB device 120 is inserted into the direct connection external interface UA1, the USB port UC of the protected device is connected, and the USB device 120 that is inserted is powered on, and the device identification process will be entered, that is, the enumeration process of the USB device 120. For example, when the USB device 120 is inserted into the external interface UA1 of the USB access control device 110, the switch between the internal interface UB and the external interface UA1 of the USB access control device 110 is turned on. At this time, the system control module can control the USB communication data analyzing module between them to acquire the descriptor/descriptors of the USB device 120 and compare the descriptor/descriptors of the USB device 120 with that in the registration information of the USB device 120. If the descriptor/descriptors of the USB device 120 is/are the same as that in the registration information of the USB device 120, the switch in the USB access control device 110 (for example, the switch between the external interface UA1 and the external interface UA2) is turned on, so that the USB device 120 can communicate with the protected device 130; When the USB device 120 communicates with the protected device 130, it is necessary to continue to acquire the descriptor/descriptors of the USB device 120 through the USB communication data analyzing module between the external interface UA1 and the external interface UA2 of the USB access control device 110, and continue to compare the descriptor/descriptors of the USB device 120 with that in the registration information of the USB device 120. If the descriptor/descriptors of the USB device 120 is/are different from that/those in the registration information of the USB device 120, Turn off the switch deployed in the USB access control device (for example, the switch between the external interface UA1 and the external interface UA2). At this time, the USB device 120 cannot communicate with the protected device 130, thus realizing the data security of the protected device 130.

Specifically, after the USB device 120 is connected to the UA1 of the USB access control device 110, the USB port on the protected device 130 is connected through the internal connection of the USB access control device 110, and the inserted USB device 120 is powered on, which will enter the device identification process according to the USB specification, that is, the first enumeration process of the USB device 120. After the first enumeration, the communication data between USB device 120 and protected device 130 can be acquired in real time through the USB communication data analyzing module. The USB communication data analyzing module on the operation and main control board will analyze the communication data between USB device 120 and protected device 130 in real time and acquire the descriptor/descriptors in the enumeration process (for example, Supplier ID, product identification code (PID) and serial number information, configuration number, currently used configuration identification, number of interfaces supported by configuration, interface number, interface class, interface subclass, interface protocol, etc.), and the descriptor/descriptors in the registered information are compared and matched. If any inconsistency is found, the communication between USB device 120 and protected device 130 is disconnected and an alarm message is sent.

In some embodiments of the present disclosure, the descriptor/descriptors of the USB device 120 may include any one or more of the following: a device descriptor, a configuration descriptor, an interface descriptor, and an HID descriptor.

According to the USB protocol specification, a USB device 120 has only one device descriptor, which includes the following table 1.

TABLE 1

| offset | name | Size (bytes) | description |
|---|---|---|---|
| 0 | bLength | 1 | Descriptor length (18 bytes) |
| 1 | bDescriptiorType | 1 | Descriptor type (device descriptor is 0x01) |
| 2 | bcdUSB | 2 | The USB protocol version used by the device. |
| 4 | bDeviceClass | 1 | Class code |
| 5 | bDeviceSubClass | 1 | Subclass code |
| 6 | bDeviceProtocol | 1 | Protocol used by the device |
| 7 | bMaxPacketSize0 | 1 | Maximum packet length of endpoint 0 (only 8, 16, 32, 64 are legal values) |
| 8 | idVender | 2 | Manufacturer ID |
| 10 | idProduct | 2 | Product ID |
| 12 | bcdDevice | 2 | Equipment version number |
| 14 | iManufacturer | 1 | Index of the string describing the manufacturer. |
| 15 | iProduct | 1 | The index of the string describing the product. |
| 16 | iSerialNumber | 1 | Index of product serial number string |
| 17 | bNumConfig-urations | 1 | Configuration number |

According to the USB protocol specification, the USB device 120 can have at least one or more configuration descriptor/descriptors, and the number of configuration descriptors is specified in the last item bNumConfigurations of the above device descriptors. For example, the USB device 120 currently selects one of the configurations, and the configuration descriptor information is shown in Table 2, in which bConfiguration Value is the identification of the current configuration.

TABLE 2

| offset | name | Size (bytes) | description |
|---|---|---|---|
| 0 | bLength | 1 | Descriptor length (9 bytes) |
| 1 | bDescriptorType | 1 | Descriptor type (configuration descriptor is 0x02) |
| 2 | wTotalLength | 2 | Total length of configuration descriptor set |
| 4 | bNumInterfaces | 1 | Configure the number of interfaces supported. |
| 5 | bConfigurationValue | 1 | Configured values |
| 6 | iConfiguration | 1 | Describes the reconfigured string index value. |
| 7 | bmAttributes | 1 | The properties of this device |
| 8 | bMaxPower | 1 | Current required by the equipment (the unit of measurement is 2 mA) |

The above interface descriptors can be used to describe the interface situation under the above current configuration. For example, the single-function USB device 120 has an interface, such as a USB flash drive. The multi-function USB device 120 has multiple interfaces, for example, a mouse and keyboard integrated composite device, where one interface corresponds to a function. A USB device 120 can have multiple configurations, but only one configuration can be selected at present. When the device descriptor device type bDeviceClass is 0, it means that the interface descriptor is used to identify the category. At this time, the interface class, interface subclass and interface protocol are used to describe the category to which the USB device 120 belongs.

Figure 4:
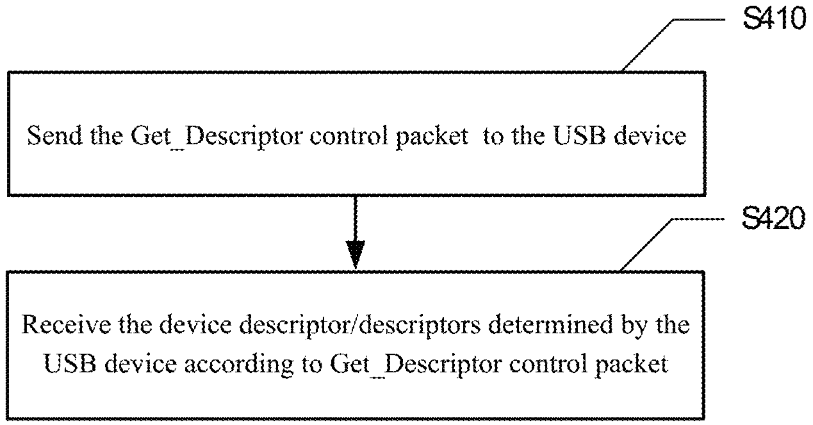
FIG. 4 is a flowchart of a method for controlling access of USB device according to another exemplary embodiment.

FIG. 4 is a flowchart of a USB device access control method according to another exemplary embodiment.

As shown in FIG. 4, acquiring the descriptor of the USB device in the step S210 may include a step S410 and a step S420.

In the step S410, the Get_Descriptor control packet is sent to the USB device.

In the step S420, the device descriptor/descriptors determined by the USB device according to Get_Descriptor control packet is/are received.

The method can request to acquire the device descriptor/descriptors of the USB device by sending a USB command (for example, a Get_Descriptor control packet) to the USB device, so that the USB access control device can quickly acquire the device descriptor/descriptors of the USB device.

Referring to FIG. 3, when the USB device 120 is connected to the external interface UA1 of the USB access control device 110, the system control module controls the USB communication data analyzing module between the internal interface UB and the external interface UA1 to acquire the device descriptor/descriptors of the USB device 120, and determines whether to turn on or off the switch in the USB access control device 110 based on the device descriptor/descriptors. Specifically, when the USB device 120 is connected to the external interface UA1 of the USB access control device 110, a Get_Descriptor control packet is sent to the USB device 120 through the USB communication data analyzing module between the internal interface UB and the external interface UA1, and the USB device 120 returns its device descriptor/descriptors to the USB communication data analyzing module based on the control packet, for example, Returns bDeviceClass, bdeviceclass, bDeviceProtocol, bLength, bDescriptorType, bString and so on in the device descriptor/descriptors. In this case, the USB communication data analyzing module can compare the pre-acquired registration information of the USB device 120 with the currently acquired device descriptor, and enumerate the USB devices 120 for the first time in this way.

For example, comparing the descriptor of the USB device 120 with that in the registration information of the USB device 120 comprises: comparing to determine whether the bDeviceClass in the device descriptor is the same as the bDeviceClass in the registration information; Comparing to determine whether the bDeviceSubClass in the device descriptor is the same as the bDeviceSubClass in the registration information; Comparing to determine whether the bDeviceProtocol in the device descriptor is the same as the bDeviceProtocol in the registration information; Comparing to determine whether the bLength in the device descriptor is the same as the bLength in the registration information; Comparing to determine whether the bDescriptorType in the device descriptor is the same as the bDescriptorType in the registration information; And comparing to determine whether the bString in the device descriptor is the same as the bString in the registration information.

In some embodiments of the present disclosure, if the bDeviceClass, bDeviceSubClass, bDeviceProtocol, bLength, bdescriptype, and bString in the device descriptor are correspondingly the same as the bDeviceClass, bDeviceSubClass, bDeviceProtocol, bLength, bdescriptype, and bString in the registration information, the switch in the USB access control device 110 is turned on. For example, the switch between the external interface UA1 and the external interface UA2 in the USB access control device 110 is turned on.

In some embodiments of the present disclosure, If there is any difference between the bDeviceClass, bDeviceSubClass, bDeviceProtocol, bLength, bDescriptorType, bString in the device descriptor and the corresponding bDeviceClass, bDeviceSubClass, bDeviceProtocol, bLength, bDescriptorType, bString, turn off the switch/switches in USB access control device 110. For example, the switch between the external interface UA1 and the external interface UA2 in the USB access control device 110 is turned off. It should be noted that if the device descriptor of the descriptors of the USB device 120 is/are different from the device descriptor in the registration information, and the switch in the USB access control device 110 is in the off state, it is needed only to keep it in the off state at this time.

Figure 5:
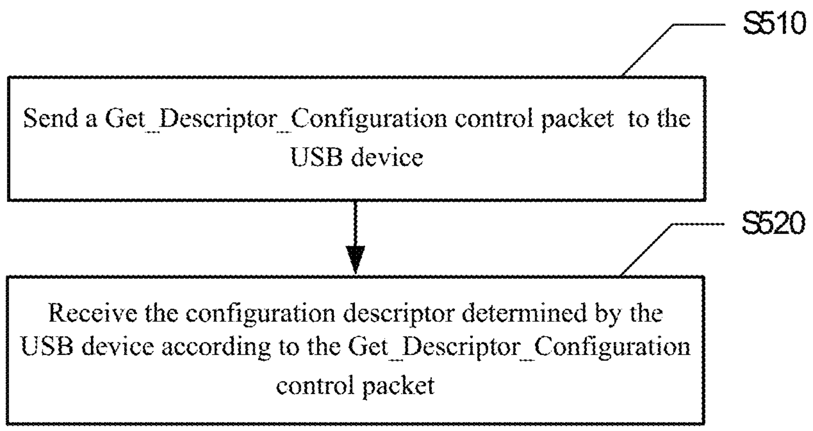
FIG. 5 is a flowchart of a method for controlling access of USB device according to another exemplary embodiment.

FIG. 5 is a flowchart of a USB device access control method according to another exemplary embodiment.

As shown in FIG. 5, acquiring the descriptor/descriptors of the USB device in step S210 may comprise a step S510 and a step S520.

In step S510, a Get_Descriptor_Configuration control packet is sent to the USB device.

In step S520, the configuration descriptor determined by the USB device according to the Get_Descriptor_Configuration control packet is received.

The method can request to acquire the configuration descriptor of the USB device by sending a USB command (for example, a Get_Descriptor_Configuration control packet) to the USB device, so that the USB access control device can quickly acquire the configuration descriptor of the USB device.

Referring to FIG. 3, when the USB device 120 is inserted into the external interface UA1 of the USB access control device 110, the system control module controls the USB communication data analyzing module between the internal interface UB and the external interface UA1 to acquire the configuration descriptor of the USB device 120, and determines whether to turn on or off the switch in the USB access control device 110 based on the configuration descriptor. Specifically, when the USB device 120 is inserted into the external interface UA1 of the USB access control device 110, a Get_Descriptor_Configuration control packet is sent to the USB device 120 through the USB communication data analyzing module between the internal interface UB and the external interface UA1, and the USB device 120 returns its configuration descriptor to the USB communication data analyzing module based on the control packet, for example, Returns bNumInterfaces, bConfiguration Value, wTotalLength and so on in the configuration descriptors. In this case, the USB communication data analyzing module can compare the pre-acquired registration information of the USB device 120 with the currently acquired configuration descriptor, so as to enumerate the USB devices 120 for the first time.

For example, comparing the descriptor/descriptors of the USB device 120 with that in the registration information of the USB device 120 comprises: comparing to determine whether the bNumInterfaces in the configuration descriptor are the same as that in the registration information; Comparing to determine whether the bConfiguration Value in the configuration descriptor is the same as the bConfiguration Value in the registration information; And comparing to determine whether the wTotalLength in the configuration descriptor is the same as that in the registration information.

In some embodiments of the present disclosure, if the bNumInterfaces, bConfiguration Value, wTotalLenth1 in the configuration descriptor correspond to the bNumInterfaces, bConfiguration Value, and wTotalLenth1 in the registration information, the switch of the USB access control device 110 is turned on. For example, the switch between the external interface UA1 and the external interface UA2 in the USB access control device 110 is turned on.

In some embodiments of the present disclosure, if there is any difference between the bNumInterfaces, bConfiguration Value, wTotalLenth in the configuration descriptor and the corresponding bNumInterfaces, bConfiguration Value, wTotalLenth in the registration information, the switch of the USB access control device 110 is turned off. For example, the switch between the external interface UA1 and the external interface UA2 in the USB access control device 110 is turned off. It should be noted that if the configuration descriptor of the descriptors of the USB device 120 is different from the configuration descriptor in the registration information, and the switch in the USB access control device 110 is in the off state, it is only need to keep it in the off state at this time.

Figure 6:
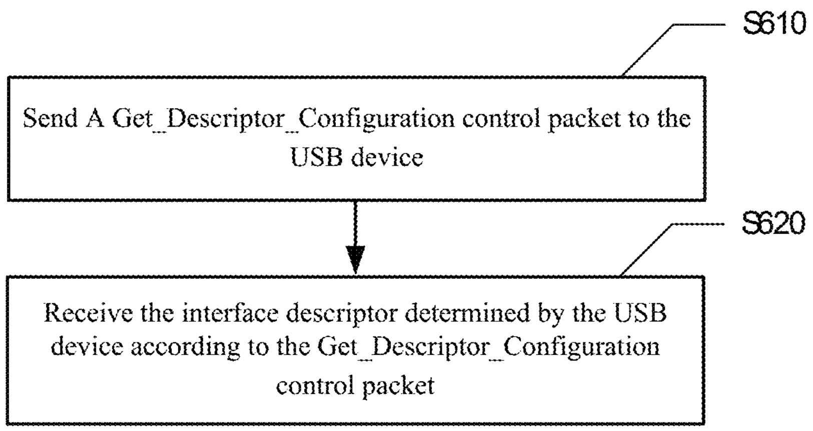
FIG. 6 is a flowchart of a method for controlling access of USB device according to another exemplary embodiment.

FIG. 6 is a flowchart of a USB device access control method according to another exemplary embodiment.

As shown in FIG. 6, acquiring the descriptor/descriptors of the USB device in step S210 may include a step S610 and a step S620.

In the step S610, a Get_Descriptor_Configuration control packet is sent to the USB device.

In the step S620, the interface descriptor determined by the USB device according to the Get_Descriptor_Configuration control packet is received.

The method can request to acquire the interface descriptor of the USB device by sending a USB command (for example, a Get_Descriptor_Configuration control packet) to the USB device, so that the USB access control device can quickly acquire the interface descriptor of the USB device.

Referring to FIG. 3, when the USB device 120 is inserted into the external interface UA1 of the USB access control device 110, the system control module controls the USB communication data analyzing module between the internal interface UB and the external interface UA1 to acquire the interface descriptor of the USB device 120, and determines whether to turn on or off the switch in the USB access control device 110 based on the interface descriptor. Specifically, when the USB device 120 is inserted into the external interface UA1 of the USB access control device 110, a Get_Descriptor_Configuration control packet is sent to the USB device 120 through the USB communication data analyzing module between the internal interface UB and the external interface UA1, and the USB device 120 returns its interface descriptor to the USB communication data analyzing module based on the control packet, for example, returns the bInterfaceNumber, bInterfaceClass, bDeviceSubClass, bInterfaceProtocol and so on in the interface descriptor. In this case, the USB communication data analyzing module can compare the registered information of the USB device 120 acquired in advance with the currently acquired interface descriptor, and enumerate the USB devices 120 for the first time in this way.

For example, comparing to determine the descriptor of the USB device 120 with the registration information of the USB device 120 comprises: comparing to determine whether the bInterfaceNumber in the interface descriptor is the same as the bInterfaceNumber in the registration information; Comparing to determine whether the bInterfaceClass in the interface descriptor is the same as the bInterfaceClass in the registration information; Comparing to determine whether the bInterfaceSubClass in the interface descriptor is the same as the bInterfaceSubClass in the registration information; And comparing to determine whether the bInterfaceProtocol in the interface descriptor is the same as the bInterfaceProtocol in the registration information.

In some embodiments of the present disclosure, if the descriptor/descriptors of the USB device 120 is/are the same as that in the registration information of the USB device 120, turning on the switches in the USB access control device 110 comprises: If the interface descriptors bInterfaceNumber, bInterfaceClass, bInterfaceSubClass, bInterfaceProtocol are correspondingly the same as the bInterfaceNumber, bInterfaceClass, bInterfaceSubClass, bInterfaceProtocol, the switch in USB access control device 110 is turned on. For example, the switch between the external interface UA1 and the external interface UA2 in the USB access control device 110 is turned on.

In some embodiments of the present disclosure, if the descriptor/descriptors of the USB device 120 is/are different from that in the registration information of the USB device 120, turning off the switches in the USB access control device 110 comprises: If there is any difference between the interface descriptors bInterfaceNumber, bInterfaceClass, bInterfaceSubClass, bInterfaceProtocol and the bInterfaceNumber, bInterfaceClass, bInterfaceSubClass and bInterfaceProtocol, turn off the switch in USB access control device 110. For example, the switch between the external interface UA1 and the external interface UA2 in the USB access control device 110 is turned off. It should be noted that if the interface descriptor of the descriptors of the USB device 120 is different from the interface descriptor in the registration information, and the switch in the USB access control device 110 is in the off state, it is only need to keep it in the off state at this time.

The embodiments of FIGS. 4 to 6 describe that the descriptor of a USB device can be a device descriptor, a configuration descriptor, or an interface descriptor. It should be noted that the descriptor of the USB device in the present disclosure may include a device descriptor, a configuration descriptor, and an interface descriptor. Referring to FIG. 3, when the USB device 120 is inserted into the external interface UA1 of the USB access control device 110, the device descriptor, configuration descriptor and interface descriptor of the USB device 120 are acquired through the USB communication data analyzing module between the external interface UA1 and the internal interface UB in the USB access control device 110. For example, a USB command is sent to the USB device 120, and the USB device 120 returns a device descriptor, a configuration descriptor, and an interface descriptor according to the corresponding USB command. Then the USB communication data analyzing module compares the device descriptor, the configuration descriptor and the interface descriptor based on the device descriptor, the configuration descriptor and the interface descriptor in the registration information of the USB device 120, which is the first enumeration of the USB device 120. If the device descriptor, configuration descriptor and interface descriptor in the descriptor of the USB device 120 are the same as the device descriptor, configuration descriptor and interface descriptor in the registration information, the switch in the USB access control device 110 is turned on. For example, the switch between the external interface UA1 and the external interface UA2 in the USB access control device 110 is turned on. On the contrary, if there is any difference between the device descriptor, configuration descriptor, interface descriptor of the descriptors of the USB device and those in the registration information, the switch in the USB access control device 110 is turned off. For example, the switch between the external interface UA1 and the external interface UA2 in the USB access control device 110 is turned off. It should be noted that if there is any difference between the device descriptor, configuration descriptor and interface descriptor of the descriptors of the USB device 120 and those in the registration information, and the switch in the USB access control device 110 is in the off state, it is only need to keep it in the off state at this time.

Based on the technical solution of the above embodiment, if the USB device 120 is an HID device (Human Interface Devices), the descriptor/descriptor of the USB device 120 can include not only the device descriptor, the configuration descriptor, and the interface descriptor mentioned above, but also an HID descriptor. If the device descriptor, configuration descriptor, interface descriptor, and HID descriptor of the descriptors of the USB device 120 are correspondingly same as the device descriptor, configuration descriptor, interface descriptor, and HID descriptor in the registration information, the switch in the USB access control device 110 is turned on. On the contrary, if there is any difference between the device descriptor, configuration descriptor, interface descriptor, HID descriptor of the descriptors of USB device 120 and those in the registration information, the switch in USB access control device 110 is turned off. It should be noted that if there is any difference between the device descriptor, configuration descriptor, interface descriptor, HID descriptor of the descriptors of the USB device 120 and those in the registration information the switch in the USB access control device 110 is in the off state, it is only need to keep it in the off state at this time.

Referring to FIG. 3, after the first enumeration of the USB device 120, the switch between the external interface UA1 and the external interface UA2 in the USB access control device 110 is turned, and the USB device 120 can communicate with the protected device 130 at this time. However, due to the possibility that the user may change the function of the USB device 120 through the hidden function of the USB device 120 during the using process of the USB device 120, such as opening the hidden storage area and activating the storage function, the descriptor of the USB device 120 is changed due to such operations, and the enumeration of the USB device 120 is triggered again at this time. In order to prevent the user from opening other functions of the USB device 120 during the use, The USB communication data analyzing module analyzes the USB communication data between UA1 and UA2 in real time. After the USB device 120 passes the authentication, if the information is enumerated again during the using process of the USB device 120, the communication between UA1 and UA2 will be disconnected and an alarm will be triggered. For example, after the first enumeration of the USB device 120 passes, the switch between the external interface UA1 and the external interface UA2 in the USB access control device 110 is turned on, and the USB device 120 can communicate with the protected device 130 at this time. In the process of communication between them, it is also need to acquire the descriptors of USB device 120 in real time through the USB communication data analyzing module between external interface UA1 and external interface UA2 in USB access control device 110, and turn off the switch between external interface UA1 and external interface UA2 when it is detected that the descriptors of USB device 120 is modified, enumerate the USB devices for the second time, which can prevent the user from opening the storage or unauthorized function of the USB device 120 in actual using process, evading the data security supervision, and data leakage on the protected device 110. In this way, the protection of the protected device 110 can be strengthened.

The USB device access control method provided by the disclosure can realize the takeover of each interface of the protected device 130, and ensure that the use of the USB port or serial port device of the protected device 130 can be realized through an external terminal protection device (namely, the USB access control device 110), so that the purpose of protecting the USB port or serial port of the protected device 130 can be achieved without installing security protection software on the protected device 130. For example, when using the USB device 120, the USB access control device 110 will compare to determine the descriptor information of the USB device 120 with the registration information of the USB device 120, and if the comparison result is "different", it will prohibit the USB device 120 from accessing and terminate the use of the USB device 120.

Figure 7:
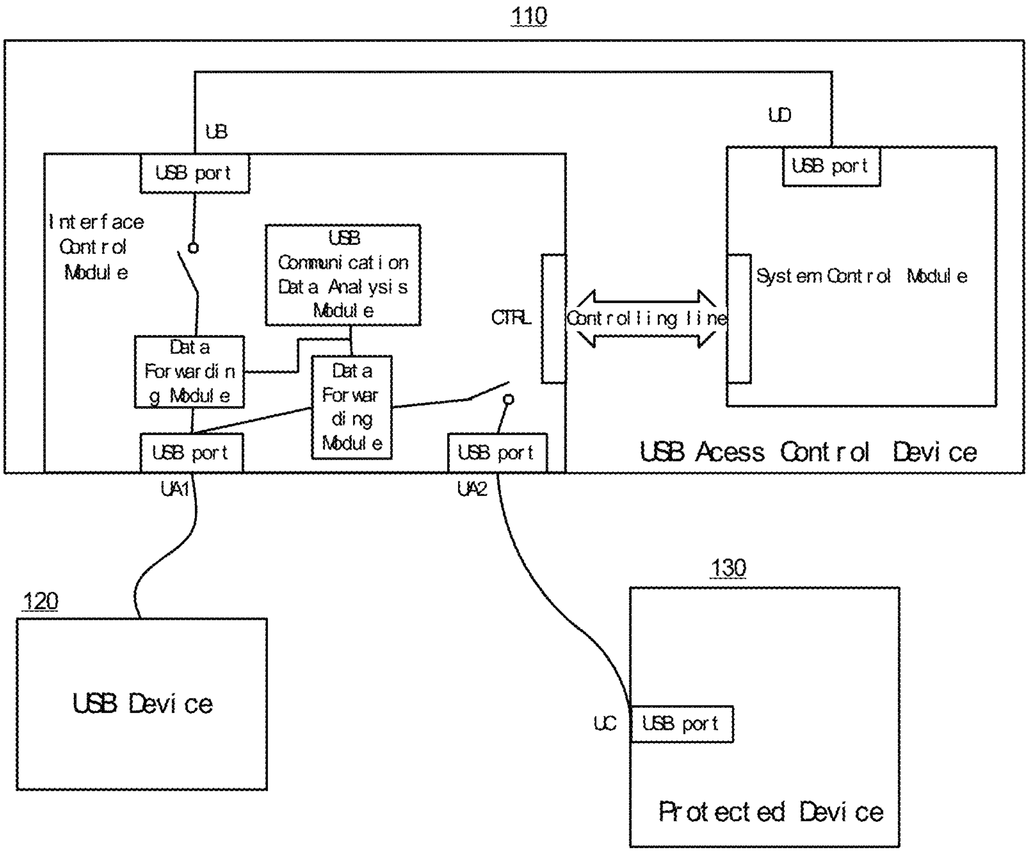
FIG. 7 is a schematic diagram showing the connection relationship between a data forwarding module and a USB communication data analyzing module according to an exemplary embodiment.

Referring to FIG. 3, the USB communication data analyzing module in the USB access control device 110 can be connected in series between the USB device 120 inserted by the user and the protected device 130, and between the USB device 120 and the system control module in the USB access control device 110. Referring to FIG. 7, communication data forwarding is realized by the data forwarding module, so that the USB communication data analyzing module can be bypassed between the USB device 120 inserted by the user and the protected device 130, and between the system control module in the USB access control device 110. There is a switch between the USB device 120 inserted by the user and the protected device 130, for example, a program-controlled electronic switch, and the on-off between the USB device 120 inserted by the user and the protected device 130 can be controlled by a control program. The USB access control device 110 can be connected to the control center through the network port to realize unified management, or it can operate independently without the control center.

Figure 8:
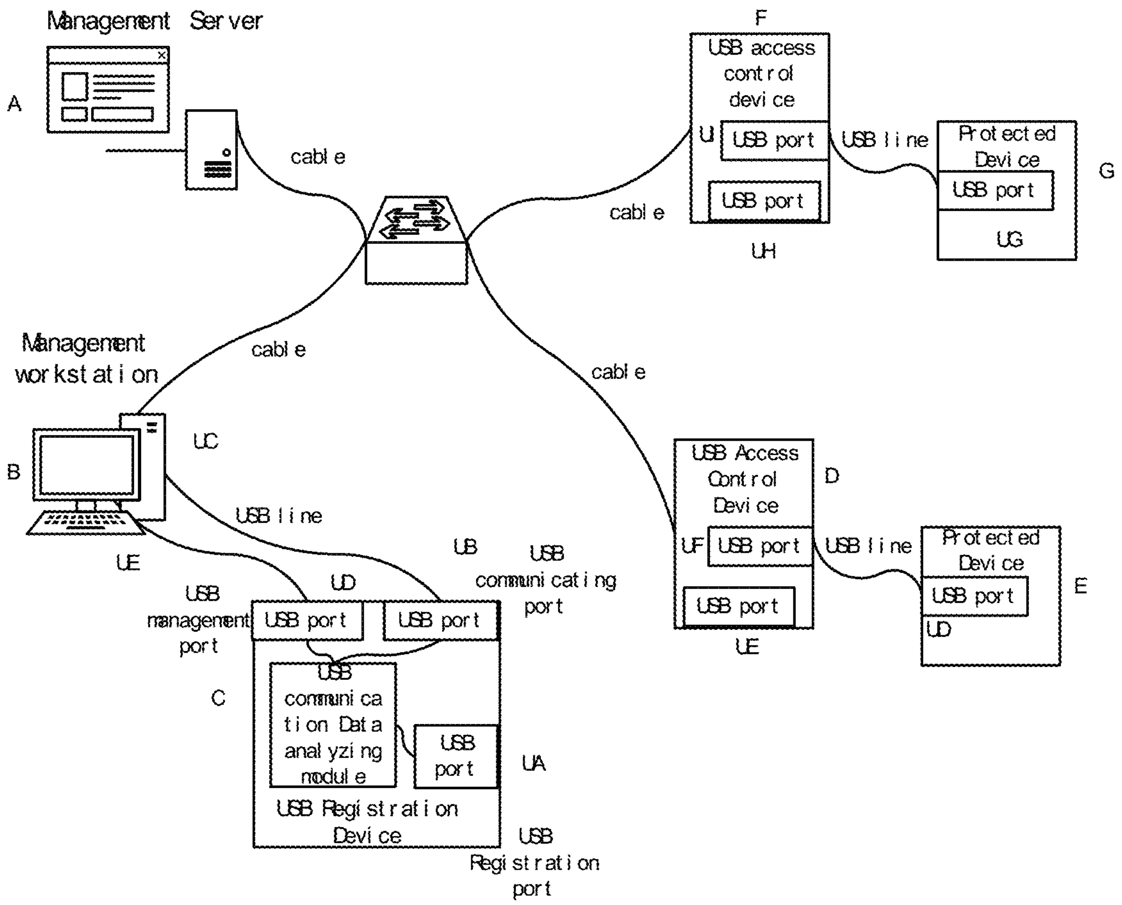
FIG. 8 is a schematic diagram of an online version of USB device access control system according to an exemplary embodiment.

Referring to FIG. 8, USB devices need to be registered before use, that is, authorized. Traditional device authorization is only aimed at the vendor ID(VID), product identification code (PID) and serial number information of USB devices. However, due to the possibility of tampering with the vendor ID, product identification code (PID) and serial number information, such registration cannot prevent users from modifying the firmware information of USB devices after using USB devices, so that the vendor ID, product identification code (PID) and serial number of malicious USB devices are consistent with the information of legitimate USB registered devices. In view of the above situation, the registration process in the present disclosure is to acquire the descriptor information of the USB device to confirm the access mode of the USB device and load the corresponding driver. USB descriptors include device descriptor, configuration descriptor, interface descriptor, endpoint descriptor and string descriptor, and HID devices also include three descriptors: HID descriptor, report descriptor and physical descriptor.

Specifically, before USB devices are plugged into USB access control devices D and F, they need to be plugged into USB registration port UA of USB registration device C for registration authorization. The USB registration device C is connected with the management workstation B through a USB port. For example, when a USB device is plugged into a USB registration device C, the descriptor/descriptors of the USB device, namely registration information, can be acquired through the USB communication data analyzing module in the USB registration device C, and the descriptor/descriptors of the USB device can be verified according to the USB protocol specification. Then the descriptor/descriptors of the verified USB device is/are sent to the management workstation B through the USB communication port. The management workstation B can report the registration information of USB devices to the management server A through the network, so that the management server A can uniformly manage the registration information of USB devices. When USB devices are inserted into USB access control devices D and F, the management server A can be request to acquire the registration information of USB devices, which is convenient to compare the registration information of USB devices with the descriptors of USB devices after USB devices are inserted into USB access control devices D and F. If they are consistent, the USB device can communicate with the protected devices G and E. On the contrary, if they are not consistent, the USB device can not communicate with the protected devices G and E.

Figure 9:
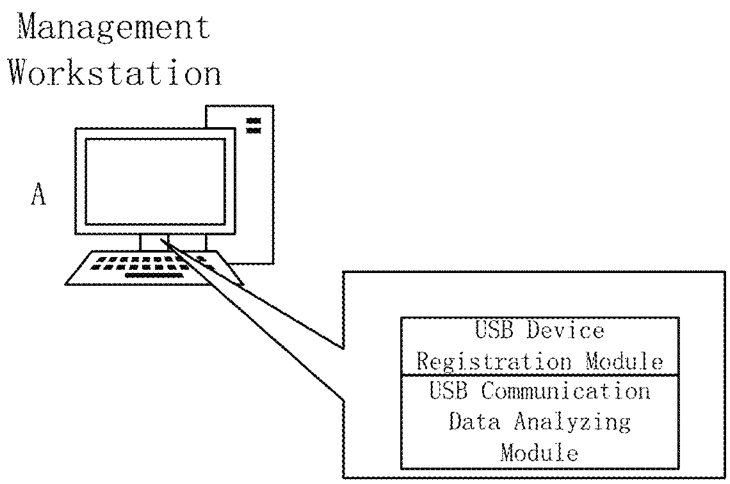
FIG. 9 is a schematic diagram of the software deployed by management workstation A according to an exemplary embodiment.

In the embodiment of the disclosure, the registration authorization of the USB device can be realized by software or hardware. FIG. 8 shows that the registration authorization of USB devices is realized by hardware. For example, the registration authorization of USB device is realized through the cooperation between USB registration device C and management workstation B. FIG. 9 shows that the registration authorization of USB devices is realized by the software installed in the management workstation B. For example, the user plugs the USB device into the USB port of the management workstation, and realizes the registration authorization of the USB device through the USB device registration module and the USB communication data analyzing module in the management workstation B.

When the USB device is registered and authorized, the registration software or hardware will read the device descriptor, configuration descriptor, interface descriptor and other information of the USB device, and record the current USB port descriptor information according to the currently used USB device configuration descriptor. The information includes: vendor ID, product identification code (PID) and serial number information, configuration number, currently used configuration identifier, number of interfaces supported by configuration, interface number, interface class, interface subclass, interface protocol, etc. Based on this information, a unique identifier is generated as a USB device legitimacy mark.

If the USB device is a Human Interface Devices (HID), the registered software or hardware will further collect the HID descriptor information of the HID device, because there are many attacks based on the HID device class nowadays. According to the USB protocol specification, the type definition of the HID device can be placed in the interface descriptor, and the device descriptor and configuration descriptor of USB do not contain the information of the HID device.

Figure 10:
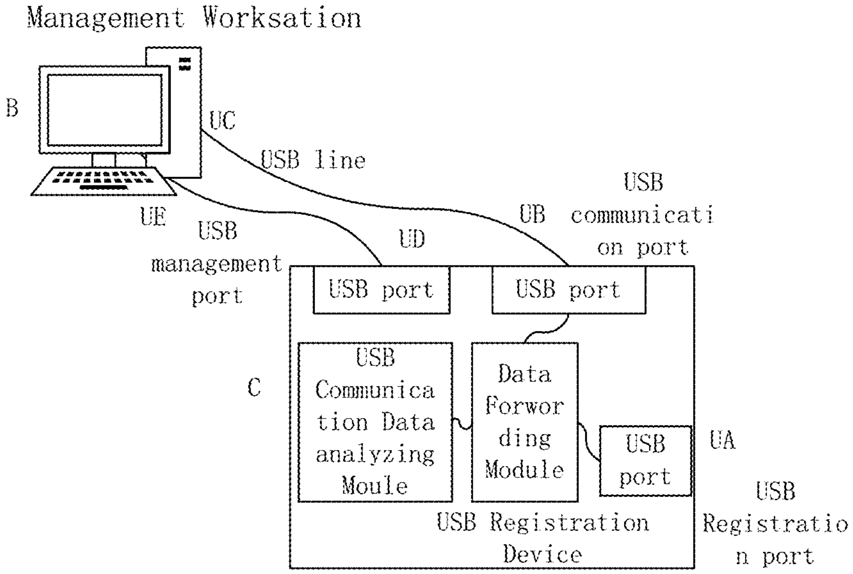
FIG. 10 is a schematic diagram of the connection relationship between a USB communication data analyzing module and a data forwarding module in a USB registration device according to an exemplary embodiment.

Refer to FIG. 8 and FIG. 10, that USB communication data analyzing module can be connected in series between the USB registration port and the USB communication port or the data forwarding module can be used to realize bypass connection on the communication line between the USB registration port and the USB communication port.

Those skilled in the art can understand that all or part of the steps to realize the above-mentioned embodiments are implemented as computer programs executed by CPU. When the computer program is executed by a CPU, the above functions defined by the above methods provided by the present disclosure are executed. The program can be stored in a computer-readable storage medium, which can be read-only memory, magnetic disk or optical disk, etc.

Furthermore, it should be noted that the above drawings are only schematic illustrations of the processes included in the method according to the exemplary embodiment of the present disclosure, and are not for limiting purposes. It is easy to understand that the processes shown in the above figures do not indicate or limit the time sequence of these processes. In addition, it is also easy to understand that these processes can be performed synchronously or asynchronously in multiple modules, for example.

The following are the embodiments of the disclosed device, which can be used to execute the embodiments of the disclosed method. For details not disclosed in the embodiment of the disclosed device, please refer to the embodiment of the disclosed method.

Figure 11:
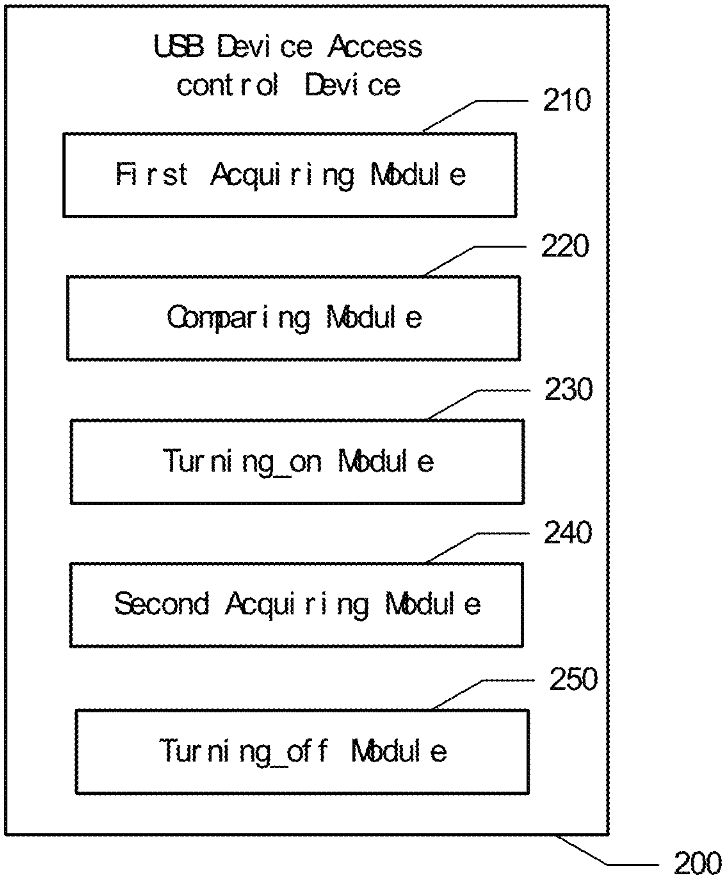
FIG. 11 is a block diagram of a USB device access control device according to an exemplary embodiment.

FIG. 11 is a block diagram of a USB device access control device according to another exemplary embodiment.

As shown in FIG. 11, the USB device access control device 200 includes a first acquiring module 210, a comparing module 220, a turning_on module 230, a second acquiring module 240 and a turning_off module 250.

Specifically, the first acquiring module 210 acquires the descriptor/descriptors of the USB device when the USB device is connected with the USB access control device.

The comparing module 220 is configured to compare the descriptor/descriptors of the USB device with that in the registration information of the USB device.

The turning_on module 230 is used for turning on the switch in the USB access control device if the descriptor/descriptors of the USB device is/are the same as that/those in the registration information of the USB device, so that the USB device can communicate with the protected device.

The second acquiring module 240, when the USB device is communicating with the protected device, continues to acquire the descriptor/descriptors of the USB device and compares the descriptor/descriptors of the USB device with that in the registration information of the USB device.

The turning_off module 250 is use for turning off the switch in the USB access control device if the descriptor/descriptors of the USB device is/are different from the registration information of the USB device.

The USB device access control device 200 can protect the data security of the protected device through the USB access control device externally connected to the protected device. The data security of the protected device can be ensured without installing security protection software on the protected device. The USB access control device can determine whether to turn on the switch in the USB access control device according to the descriptor/descriptors of the USB device. If the descriptor/descriptors of the USB device is/are the same as that in the registration information of the USB device, the switch in the USB access control device is turned on, so that the USB device can communicate with the protected device. At this time, although the descriptor of the USB device has passed the verification, in order to strengthen the protection of the protected device, it is necessary to continue to acquire the descriptor/descriptors of the USB device and compare the descriptor of the USB device with that in the registration information of the USB device in real time. This further ensures the data security of the protected equipment.

According to the embodiment of the present disclosure, the USB device access control device 200 can be used to realize the USB device access control method described in the above embodiment.

Figure 12:
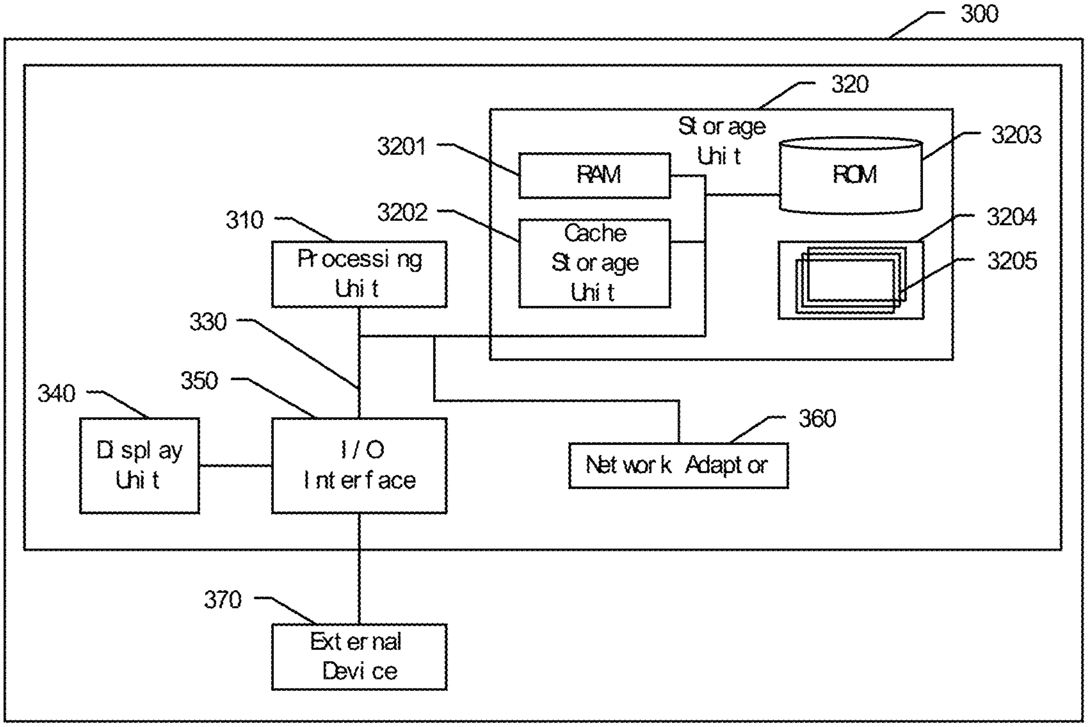
FIG. 12 is a block diagram of an electronic device according to an exemplary embodiment.

FIG. 12 is a block diagram of an electronic device according to an exemplary embodiment.

An electronic device 300 according to this embodiment of the present disclosure will be described below with reference to FIG. 12. The electronic device 300 shown in FIG. 12 is just an example, and should not bring any limitation to the function and application scope of the disclosed embodiment.

As shown in FIG. 12, the electronic device 300 is represented in the form of a general-purpose computing device. Components of the electronic device 300 may include, but are not limited to, at least one processing unit 310, at least one storage unit 320, a bus 330 connecting different system components (including the storage unit 320 and the processing unit 310), a display unit 340, and the like.

Wherein, the storage unit stores a program code, and the program code can be executed by the processing unit 310, so that the processing unit 310 performs the steps in this specification according to various exemplary embodiments of the present disclosure. For example, the processing unit 310 may perform the steps shown in FIGS. 2 to 6.

The storage unit 320 may include a readable medium in the form of a volatile storage unit, such as a random access storage unit (RAM) 3201 and/or a cache storage unit 3202, and may further include a read-only storage unit (ROM) 3203.

The storage unit 320 may also include a program/utility 3204 with a group (at least one) of program modules 3205, such program modules 3205 include, but are not limited to, an operating system, one or more application programs, other program modules and program data, and each or some combination of these examples may include the implementation of a network environment.

The bus 330 may represent one or more of several bus structures, including a memory cell bus or a memory cell controller, a peripheral bus, a graphics acceleration port, a processing unit, or a local bus using any of a variety of bus structures.

The electronic device 300 can also communicate with one or more external devices 300 (e.g., keyboard, pointing device, Bluetooth device, etc.), so that a user can communicate with devices that the electronic device 300 interacts with, and/or the electronic device 300 can communicate with any device (e.g., router, modem, etc.) that communicates with one or more other computing devices. This communication may be through an input/output (I/O) interface 350. Moreover, the electronic device 300 can also communicate with one or more networks (such as a local area network (LAN), a wide area network (WAN) and/or a public network, such as the Internet) through the network adapter 360. The network adapter 360 can communicate with other modules of the electronic device 300 through the bus 330. It should be understood that although not shown in the figure, other hardware and/or software modules can be used in conjunction with the electronic device 300, including but not limited to microcode, device drivers, redundant processing units, external disk drive arrays, RAID systems, tape drives, data backup storage systems, and the like.

Figure 13:
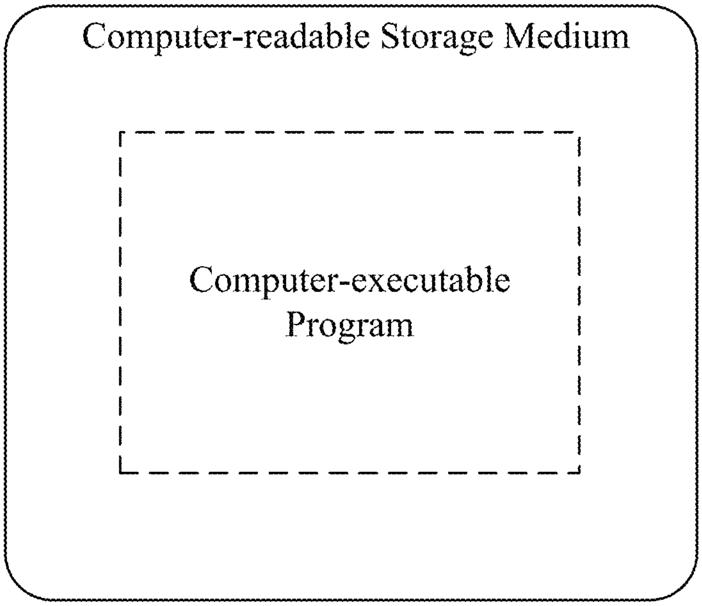
FIG. 13 is a block diagram of a computer-readable medium according to an exemplary embodiment.

Through the description of the above embodiments, it is easy for those skilled in the art to understand that the example embodiments described here can be realized by software or by combining software with necessary hardware. Therefore, as shown in FIG. 13, the technical solution according to the embodiment of the present disclosure can be embodied in the form of a software product, which can be stored in a non-volatile storage medium (which can be a CD-ROM, a USB flash drive, a mobile hard disk, etc.) or on the network, and includes several instructions to make a computing device (which can be a personal computer, a server, or a network device, etc.) execute the above method according to the embodiment of the present disclosure.

The software product can adopt any combination of one or more readable medium. The readable medium may be a readable signal medium or a readable storage medium. The readable storage medium can be, for example, but not limited to, an electrical, magnetic, optical, electromagnetic, infrared, or semiconductor system, device or device, or a combination of any of the above. More specific examples (a non-exhaustive list) of readable storage media include: an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer-readable storage medium may include a data signal propagate in baseband or as part of a carrier wave, in which readable program code is carry. This propagated data signal can take many forms, including but not limited to electromagnetic signals, optical signals or any suitable combination of the above. The readable storage medium can also be any readable medium other than the readable storage medium, which can send, propagate or transmit the program for use by or in combination with the instruction execution system, apparatus or device. The program code contained in the readable storage medium can be transmitted by any suitable medium, including but not limited to wireless, wired, optical cable, RF, etc., or any suitable combination of the above.

Program codes for performing the operations of the present disclosure can be written in any combination of one or more programming languages, including object-oriented programming languages such as Java, C++, etc., and conventional procedural programming languages such as "C" or similar programming languages. The program code may be completely executed on the user computing device, partially executed on the user device, executed as an independent software package, partially executed on the user computing device and partially executed on the remote computing device, or completely executed on the remote computing device or server. In the case involving a remote computing device, the remote computing device may be connected to a user computing device through any kind of network, including a local area network (LAN) or a wide area network (WAN), or may be connected to an external computing device (for example, through the Internet using an Internet service provider).

The computer-readable medium carries one or more programs, and when the one or more programs are executed by one device, the computer-readable medium can realize the following functions: the data security of the protected device can be protected through the USB access control device externally connected to the protected device. The data security of the protected equipment can be ensured without installing security protection software on the protected equipment. The USB access control device can determine whether to close the switch in the USB access control device according to the descriptor of the USB device. If the descriptor of the USB device is the same as that in the registration information of the USB device, the switch in the USB access control device is closed, so that the USB device can communicate with the protected device. At this time, although the descriptor of the USB device has passed the verification, in order to strengthen the protection of the protected device, it is necessary to continue to acquire the descriptor of the USB device and compare the descriptor of the USB device with the registration information of the USB device in real time. This further ensures the data security of the protected equipment.

Those skilled in the art can understand that the above modules can be distributed in devices according to the description of the embodiment, or they can be changed in one or more devices that are only different from this embodiment. The modules in the above embodiments can be merged into one module or further split into multiple sub-modules.

Through the description of the above embodiments, it is easy for those skilled in the art to understand that the example embodiments described here can be realized by software or by combining software with necessary hardware. Therefore, the technical solution according to the embodiment of the present disclosure can be embodied in the form of a software product, which can be stored in a non-volatile storage medium (CD-ROM, USB flash drive, mobile hard disk, etc.) or on the network, and includes several instructions to make a computing device (which can be a personal computer, a server, a mobile terminal, or a network device, etc.) execute the method according to the embodiment of the present disclosure.

Exemplary embodiments of the present disclosure have been specifically shown and described above. It should be understood that the present disclosure is not limited to the detailed structure, arrangement or implementation method described here; On the contrary, the disclosure is intended to cover various modifications and equivalent arrangements included within the spirit and scope of the appended claims.

The invention claimed is:

1. A method for controlling access to a USB device, wherein the method is applied to a USB access control device which is connected with a protected device through an interface, comprising the steps of:

acquiring one or more descriptors of the USB device when the USB device is connected with the USB access control device;

comparing the one or more descriptors of the USB device with registration information associated with the USB device;

wherein, if each of the one or more descriptors of the USB device is the same as that in the registration information associated with the USB device, a switch is turned on in the USB access control device, so that the USB device can communicate with the protected device;

acquiring communication data between the USB device and the protected device in real time and analyzing the communication data between USB device and protected device in real time, wherein one or more descriptors of the USB device are continuously acquired, and the acquired one or more descriptors of the USB device are compared with the registration information associated with the USB device; wherein, after the USB device passes a first enumeration and the switch is turned on, communication data between the USB device and the protected device is acquired and analyzed in real time through a USB communication data analyzing module provided in the USB access control device, and, during use of the USB device, if it is detected from the analyzed communication data that the one or more descriptors of the USB device have been modified and that the USB device is enumerated again, the switch is turned off in the USB access control device to disconnect communication between the USB device and the protected device, and an alarm is triggered;

wherein, if any one of the descriptors of the USB device is different from the registration information associated with the USB device, the switch is turned off in the USB access control device.

2. The method according to claim 1, wherein the step of acquiring the one or more descriptors of the USB device comprises:

sending a Get_Descriptor control packet to the USB device;

receiving one or more device descriptors determined by the USB device according to the Get_Descriptor control packet.

3. The method according to claim 2, wherein the step of comparing the one or more descriptors of the USB device with the registration information associated with the USB device comprises:

comparing to determine whether the bDeviceClass in the one or more descriptors of the USB device is the same as the bDeviceClass in the registration information;

comparing to determine whether the bDeviceSubClass in the one or more descriptors of the USB device is the same as the bDeviceSubClass in the registration information;

comparing to determine whether bDeviceProtocol in the one or more descriptors of the USB device is the same as bDeviceProtocol in the registration information;

comparing to determine whether the bLength in the one or more descriptors of the USB device is the same as the bLength in the registration information;

comparing to determine whether the bdescriptype in one or more descriptors of the USB device is the same as the bdescriptype in the registration information; and comparing to determine whether the bString in the one or more descriptors of the USB device is the same as the bString in the registration information.

4. The method according to claim 3, wherein if each one of the one or more descriptors of the USB device is the same as that in the registration information associated with the USB device, the step of turning on the switch in the USB access control device comprises:

if each value of bDeviceClass, bDeviceClass, bDeviceProtocol, bLength, bDescriptorType, and bString of the one or more descriptors of the USB device is equal to the corresponding descriptor in the registration information, the switch is turned on in the USB access control device.

5. The method according to claim 3, wherein if any of the one or more descriptors of the USB device is different from the corresponding descriptor in the registration information associated with the USB device, the step of turning off the switch in the USB access control device comprises:

if any value of bDeviceClass, bDeviceClass, bDeviceProtocol, bLength, bDescriptor Type, and bString of the one or more descriptors of the USB device is not equal to the corresponding descriptor in the registration information, the switch in the USB access control device is turned off.

6. The method according to claim 1, wherein the step of acquiring the one or more descriptors of the USB device comprises:

sending a Get_Descriptor_Configuration control packet to the USB device;

receiving one or more configuration descriptors determined by the USB device according to the Get_Descriptor_Configuration control packet.

7. The method according to claim 6, wherein the step of comparing the one or more descriptors of the USB device with the registration information associated with the USB device comprises:

comparing to determine whether the bNumInterfaces in the one or more configuration descriptors is the same as the bNumInterfaces in the registration information associated with the USB device;

comparing to determine whether the bConfigurationValue in the one or more configuration descriptors is the same as the bConfiguration Value in the registration information associated with the USB device; and comparing to determine whether the wTotalLength in the one or more configuration descriptors is the same as the wTotalLength in the registration information associated with the USB device.

8. The method according to claim 7, wherein if each one of the one or more descriptors of the USB device is the same as that in the registration information associated with the USB device, the step of turning on the switch in the USB access control device comprises:

if each value of bNumInterfaces, bConfiguration Value and wTotalLength of the one or more configuration descriptors is equal to the corresponding one in the registration information associated with the USB device, turning on the switch in the USB access control device.

9. The USB device access control method according to claim 7, wherein if any of the one or more descriptors of the USB device is different from the corresponding descriptor in the registration information associated with the USB device, the step of turning off the switch in the USB access control device comprises:

if any value of bNumInterfaces, bConfiguration Value and wTotalLenth of the one or more configuration descriptors is not equal to the corresponding one in the registration information associated with the USB device, the switch in the USB access control device is turned off.

10. The method according to claim 1, wherein the step of acquiring the descriptors of the USB device comprises:

sending a Get_Descriptor_Configuration control packet to the USB device;

receiving one or more interface descriptors determined by the USB device according to the Get_Descriptor_Configuration control packet.

11. The method according to claim 10, wherein the step of comparing the one or more interface descriptors of the USB device with the registration information associated with the USB device comprises:

comparing to determine whether the bInterfaceNumber in the one or more interface descriptors is the same as the bInterfaceNumber in the registration information associated with the USB device;

comparing to determine whether the bInterfaceClass in the one or more interface descriptors is the same as the bInterfaceClass in the registration information associated with the USB device;

comparing to determine whether the bInterfaceSubClass in the one or more interface descriptors is the same as the bInterfaceSubClass in the registration information associated with the USB device; and comparing to determine whether the bInterfaceProtocol in the one or more interface descriptors is the same as the bInterfaceProtocol in the registration information associated with the USB device.

12. The method according to claim 11, wherein if each one of the one or more interface descriptors of the USB device is the same as that in the registration information associated with the USB device, the step of turning on the switch in the USB access control device comprises:

if each value of bInterfaceNumber, bInterfaceClass, bInterfaceSubClass and bInterfaceProtocol of the one or more interface descriptors is equal to the corresponding registration information associated with the USB device, turning on the switch in the USB access control device.

13. The method according to claim 11, wherein if any of the one or more interface descriptors of the USB device is different from that in the registration information associated with the USB device, the step of turning off the switch in the USB access control device comprises:

if any value of bInterfaceNumber, bInterfaceClass, bInterfaceSubClass, and bInterfaceProtocol of the interface descriptors is not equal to the corresponding one in the registration information associated with the USB device, turning off the switch in the USB access control device.

14. The method according to claim 1, wherein the one or more descriptors of the USB device includes a device descriptor, a configuration descriptor, and an interface descriptor;

wherein, if each one of the one or more descriptors of the USB device is the same as that in the registration information associated with the USB device, the step of turning on the switch in the USB access control device comprises:

if each value of the device descriptor, the configuration descriptor and the interface descriptor of the one or more descriptors of the USB device is the same as that in the registration information associated with the USB device, turning on the switch in the USB access control device.

15. The method according to claim 14, wherein if any of the one or more descriptors of the USB device is different from that in the registration information associated with the USB device, the step of turning off the switch in the USB access control device comprises:

if any value of the device descriptor, the configuration descriptor and the interface descriptor of the one or more descriptors of the USB device is not equal to the corresponding one in the registration information associated with the USB device, turning off the switch in the USB access control device.

16. The method according to claim 14, wherein if the USB device is an HID device, the one or more descriptors of the USB device further includes an HID descriptor;

if each one of the one or more descriptors of the USB device is the same as that in the registration information associated with the USB device, the step of turning on the switch in the USB access control device comprises:

if each value of the device descriptor, the configuration descriptor, the interface descriptor and the HID descriptor of the one or more descriptors of the USB device is equal to the corresponding one in the registration information associated with the USB device, turning on the switch in the USB access control device.

17. The method according to claim 16, wherein if any of the one or more descriptors of the USB device is different from that in the registration information associated with the USB device, the step of turning off the switch in the USB access control device comprises:

if any value of the device descriptor, the configuration descriptor, the interface descriptor and the HID descriptor of one or more descriptors of the USB device is not equal to the corresponding one in the registration information associated with the USB device, turning off the switch in the USB access control device.

18. An apparatus for controlling access of a USB device, wherein the apparatus is applied to a USB access control device which is connected with a protected device through an interface, comprising:

a first acquiring module which is used for acquiring one or more descriptors of the USB device when the USB device is connected with the USB access control device;

a comparing module which is used for comparing the one or more descriptors of the USB device with registration information associated with the USB device;

a turning_on module which is used for turning on a switch in the USB access control device to enable the USB device to communicate with the protected device if each one of the one or more descriptors of the USB device is the same as that in the registration information associated with the USB device;

a second acquiring module for continuously acquiring the one or more descriptors of the USB device when the communication data between USB device and protected device is being acquired and analyzed in real time, and comparing the one or more descriptors of the USB device with the registration information associated with the USB device; the second acquiring module comprising a USB communication data analyzing module provided in the USB access control device, wherein after the USB device passes a first enumeration and the switch is turned on, the second acquiring module is configured to acquire and analyze communication data between the USB device and the protected device in real time, and, during use of the USB device, detect from the analyzed communication data that the one or more descriptors of the USB device have been modified and that the USB device is enumerated again;

a turning_off module for turning off the switch in the USB access control device if any one of the one or more descriptors of the USB device is different from that in the registration information associated with the USB device, and configured, when the second acquiring module detects that the one or more descriptors of the USB device have been modified and that the USB device is enumerated again during use of the USB device, to turn off the switch in the USB access control device to disconnect communication between the USB device and the protected device and trigger an alarm.

19. An electronic device, comprising:

one or more processors;

non-transient computer-readable storage for storing one or more programs;

wherein, when the one or more programs are executed by the one or more processors, the one or more processors can implement the method as claimed in claim 1.

20. A non-transitory computer-readable medium having one or more computer programs stored thereon, wherein the one or more programs, when executed by a processor, can implement the method according to claim 1.

* * * * *